United States Patent [19]
Sakuma

[11] Patent Number: 4,770,517
[45] Date of Patent: Sep. 13, 1988

[54] TWO-LENS Fθ LENS

[75] Inventor: Nobuo Sakuma, Tokyo, Japan

[73] Assignee: Ricoh Company, Ltd., Tokyo, Japan

[21] Appl. No.: 802,850

[22] Filed: Nov. 27, 1985

[30] Foreign Application Priority Data

Nov. 28, 1984 [JP] Japan .................. 59-249697

[51] Int. Cl.$^4$ .................. G02B 9/04; G02B 26/10
[52] U.S. Cl. .................. 350/479; 350/6.1; 350/6.8
[58] Field of Search .................. 350/6.8, 6.1, 434, 479, 350/480

[56] References Cited

U.S. PATENT DOCUMENTS

| | | | |
|---|---|---|---|
| 1,091,933 | 3/1914 | Humbrecht | 350/560 |
| 3,045,545 | 7/1962 | Korones et al. | 350/560 |
| 3,900,851 | 8/1975 | Bucy et al. | 346/49 |
| 3,973,833 | 8/1976 | Lawson | 350/6.8 |
| 4,179,183 | 12/1979 | Tateoka et al. | 350/6.1 |
| 4,269,478 | 5/1981 | Maeda et al. | 350/6.8 X |
| 4,277,128 | 7/1981 | Kawamura | 350/6.8 |
| 4,343,531 | 8/1982 | Tateoka et al. | 350/379 X |
| 4,353,617 | 10/1982 | Tokumitsu et al. | 350/6.8 |
| 4,357,627 | 11/1982 | Johnson | 358/348 |
| 4,390,235 | 6/1983 | Minoura | 350/6.8 |
| 4,400,063 | 8/1983 | Hayashida | 350/6.8 X |
| 4,401,362 | 8/1983 | Maeda | 350/6.8 |
| 4,436,383 | 3/1984 | Maeda | 350/6.8 X |
| 4,496,209 | 1/1985 | Itoh et al. | 350/6.8 |
| 4,497,548 | 2/1985 | Burris | 350/560 |
| 4,571,035 | 2/1986 | Sakuma | 350/6.8 |

OTHER PUBLICATIONS

How to Select Acousto-Optic Modulators, Barry Grossman, Harris Corporation, Government Communications System Division.

Primary Examiner—Bruce Y. Arnold
Assistant Examiner—Scott J. Sugarman
Attorney, Agent, or Firm—Oblon, Fisher, Spivak, McClelland & Maier

[57] ABSTRACT

This invention relates to an fθ lens for scanning a laser beam whose deflection half-angle reaches 30°. If a deflection angle increases, the curvature of field and fθ characteristic are rapidly deteriorated. According to the present invention, the fθ lens is composed of two lenses. A first lens near a beam deflection point is formed by a meniscus lens substantially in the form of a concentric spherical surface. A power of the lens and a length between a common center of two refractive surfaces and a beam deflection point are suitably selected to well-correct the curvature of field and fθ characteristic over a wide scanning angle.

6 Claims, 5 Drawing Sheets

TWO-LENS Fθ LENS

BACKGROUND OF THE INVENTION

1. Field of the Invention

This invention relates to a lens (a so-called fθ lens) in which a beam deflected by a laser beam deflector is focused on a scanning surface to scan it at uniform speed.

2. Description of the Prior Art

Known fθ lenses used for measuring apparatus, examination apparatus and the like which use a laser printer and a laser beam deflector include various kinds of lenses such as a single lens, a two-group lens, etc. However, in case of a wide angle whose deflection angle is above ±25°, many of lenses which are relatively simple in construction have insufficient curvature of field and fθ characteristic.

For example, according to an embodiment disclosed in Japanese Patent Application Laid-Open No. 137,631/78, the curvature of field is 5 to 10 mm in case of f=300 mm, and a deviation of the fθ characteristic is relatively large, i.e., approximately 0.5%. In a single fθ lens disclosed in Japanese Patent Application Laid-Open No. 5,706/83, if a deflection half-angle exceeds 25°, both the curvature of field and fθ characteristic have a problem.

This invention is intended to provide an fθ lens which comprises a small number of lenses, and in which even in a case where a deflection half-angle is 30°, it has a small curvature of field and an excellent fθ characteristic.

SUMMARY OF THE INVENTION

According to the present invention, an fθ lens comprises a first single lens in the contour of a concentric spherical surface with a concave surface oriented toward a deflection point of a laser beam, and a second single lens positioned on the light-moving side relative to said first single lens and having a positive power, the lens being satisfied with the following conditions:

$$-2.5 < f_1/f < -1 \quad (1)$$

$$0.04 < L/f < 0.08 \quad (2)$$

where $f_1$ represents the focal length of the first single lens, C the common center of both refractive surfaces of the single lens, $R_1$, $R_2$ the radius of curvatures of both refractive surfaces, f the focal length of the entire fθ lens system comprising two lenses, and L the length $\overline{OC}$ between a deflection point O the laser beam and the center C.

FIG. 4 shows a general optical arrangement of an optical deflection device in which the lens of the present invention is used, comprising a laser light source 1 and a modulation optical system 2, which comprises, in case where a light source is a gas laser such as He—Ne, a diaphragmal lens, an accoustic optical modulation element, a beam expander, etc. and which comprises, in case where a light source 1 is a semiconductor laser, a coupling lens and a beam shaping lens. Reference numeral 3 denotes an optical deflection device such as a rotational polyhedral mirror or a hologram scanner, 4 an fθ lens and 5 a photosensitive member.

The fθ lens according to the present invention comprises two lenses 4-1 and 4-2 as shown in FIG. 1. The first single lens 4-1 in the form of a concentric spherical surface with a concave surface oriented toward a deflection point of a laser beam has a negative power, and the common center C is positioned between the deflection point O and the lens 4-1. This center C also serves as a principal point ($H_1$, $H'_1$) of the lens 4-1. The length between the principal point $H_1$ and a principal point $H_2$ of the second lens 4-2 is $\overline{CH_2} = D$.

As is well known, the curvature of field is decided by the Petzval's sum P decided by only power arrangement of each surface.

$$P = \Sigma P_\nu \quad (3)$$

$$P_{84} = (N'_\nu = N_\nu)/N_\nu N'_\nu R_\nu \quad (4)$$

where R is the radius of curvature of the $\nu$ surface, and $N\nu$, $N'\nu$ are respectively the refractive indexes of a medium before and after the $\nu$ surface.

In the case of the lens according to the present invention, since the first lens 4-1 is in the form of a concentric spherical surface, the power $\phi_1$ thereof is given by $$\phi_1 = (n_1 - 1)\left(\frac{1}{R_1} - \frac{1}{R_2}\right) + \frac{(n_1 - 1)^2 d_1}{n_1 R_1 R_2}$$

$$d_1 = R_1 - R_2$$

where $N_1 = N'_2 = 1$, $N'_1 = N_2 = n$ $$\therefore \phi_1 = \frac{n_1 - 1}{n_1}\left(\frac{1}{R_1} - \frac{1}{R_2}\right)$$

This is equal to the Petzval's sum $P_1$ of the first lens as will be apparent from the equations (3) and (4).

If the second lens 4-2 is a thin-wall lens, the Petzval's sum $P_2$ thereof is given by $$P_2 = \phi_2/n_2$$

where $\phi_2$ is the power of the second lens, and $n_2$ is the refractive index of a material of which the second lens is made. In the entire system, $$P = \phi_1 + \phi_2/n_2$$

$$1 = \phi_1 + \phi_2 - D\phi_1\phi_2 = \phi$$

Since $\phi$ is the synthesized power of the entire system, $$P = \frac{1}{n_2}\left\{\left(n_2 - \frac{1-D}{1-D\phi_1}\right)\phi_1 + 1\right\}$$

FIG. 2 shows the curve of $P - \phi_1$. In the figure, curves where $n_2$ is 1.6 and 1.8 and D is 0.1 and 0.2 are shown. If D is excessively small, the deflection angle cannot be increased while if it is excessively large, the lens itself has to be made larger. Therefore, suitable D is approximately 0.1 to 0.2. In case of $\phi_1 = 0$, the Petzval's sum is a reciprocal number of the refractive index of the second lens 4-2 not depending on D. Therefore, a line of D=0.1 and a line of D=0.2 cross at an on-axis of $\phi_1 = 0$.

In the following, a discussion will be made of the desirable Petzval's sum.

In the past, in an fθ lens having a scanning width—216 mm corresponding to the short side of A4 format, write density—300 dpi and deflection angle—±21°, a meniscus single lens is used. On the other hand, according to the present invention, a two-lens arrangement is employed in an attempt of meeting high demands, and therefore, a standard write density is 400 dpi.

The spot diameter $2W_o$ in response to this target is approximately 75 μm. When an variation in spot diameter of the Gaussian beam is restrained within ±5%, an allowable curved amount 2Z of an image surface is obtained by the following equation:

$$2Z = \frac{2\pi W^2_o}{\lambda} \sqrt{\frac{\alpha}{100}\left(\frac{\alpha}{100} + 2\right)}$$

If λ is equal to 780 nm, the width of variation is α=5, and therefore, $$2Z = 3.16$$

The Petzval's sum of the lens system indicates the curvature of a paraxial image surface when the focal length is 1. Thus, let ρ be the radius of curvature of an image surface curve, and ΔS the maximum curved amount, and in case where ΔS=2Z and l=216, then $$P = \frac{f}{\rho} = \frac{2\Delta S}{(\Delta S)^2 + (1/2)^2} f = 5.414 \times 10^{-4} f$$

In the fθ lens, if l and deflection angle θ are determined, the focal length f of a using lens is determined. Thus, the allowable Petzval's sum P is obtained for each θ as follows:

| θ | 20° | 30° | 40° |
|---|---|---|---|
| f | 309.4 | 206.3 | 154.7 |
| P | 0.168 | 0.112 | 0.084 |

Usually, in the actual lens, a return of the curvature of field occurs owing to a high-order aberration, and about twice that of the above-described table is allowed. Thus, a target value of the actual Petzval's sum is estimated at less than 0.34 when θ=20°, at less than 0.22 when θ=30°, and at less than 0.17 when θ=40°.

The power $\phi_1$ of the first lens 4-1 providing the aforesaid Petzval's sum is obtained from FIG. 2. The Petzval's sum required is $\phi_1 < -0.6$ when $n_2$ is 1.6, and $\phi_1 < -0.4$ when $n_2$ is 1.8. $\phi_1 < -0.4$ is $-2.5 < f_1/f$, which means a lower limit of the condition (1). An upper limit is the condition for restraining a spherical abberration and a comatic aberration.

The condition (2) is the condition for maintaining the fθ characteristic and astigmatism in a good state.

DETAILED DESCRIPTION OF THE PREFERRED EMBODIMENTS

In the following, embodiments of the fθ lens constructed as described above will be described.

Figure 1:
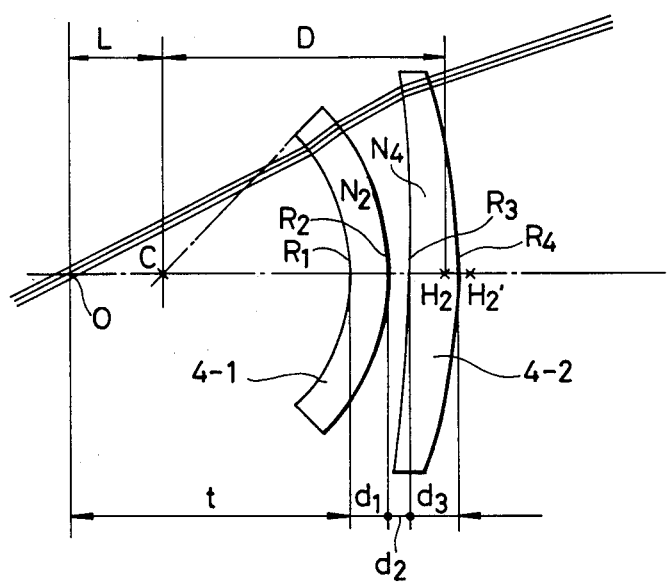
FIG. 1 is a sectional view of a lens according to the present invention.
Figure 2:
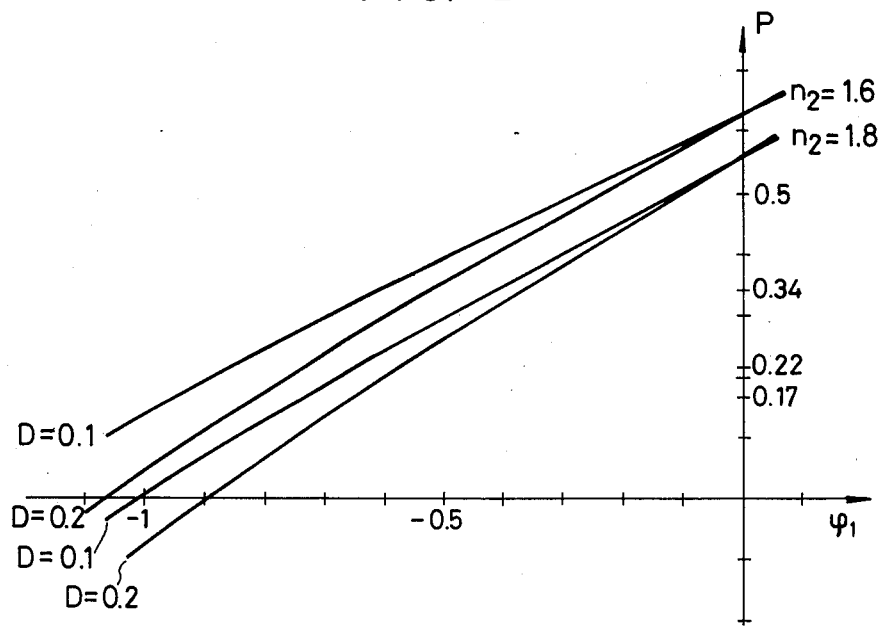
FIG. 2 is a graph showing the relationship between the power of the first lens and the Petzval's sum.
Figure 3:
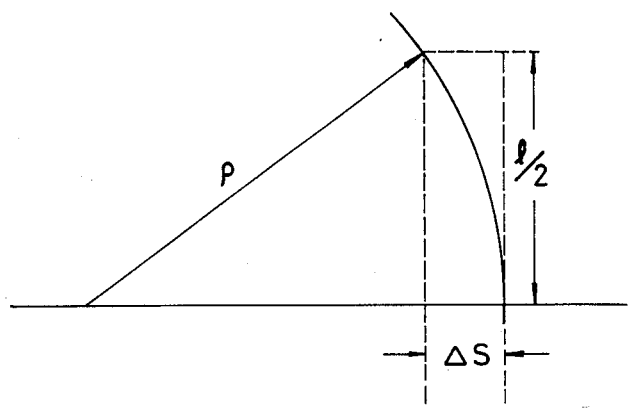
FIG. 3 illustrates the relationship between the curvature of field and the curved amount.
Figure 4:
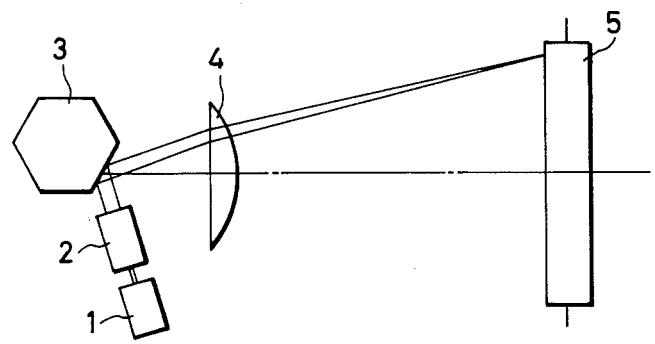
FIG. 4 shows an arrangement of an optical deflection device.
Figure 5:
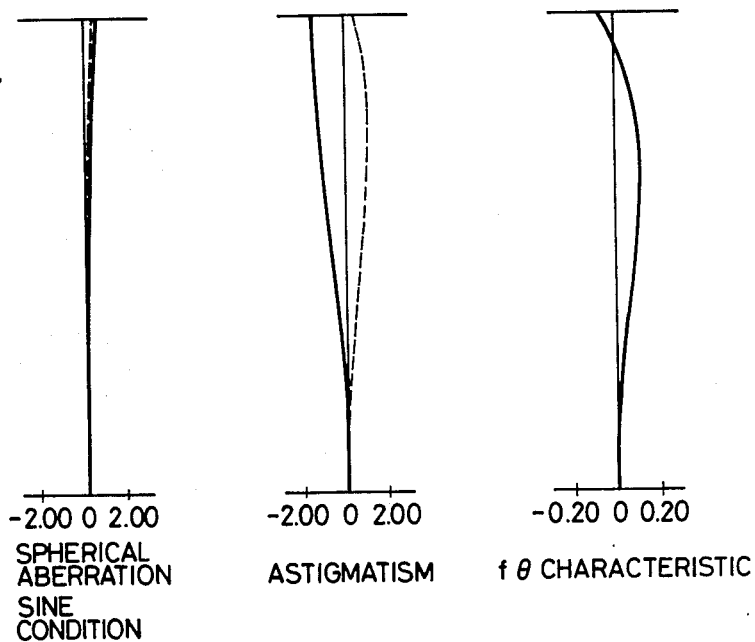
FIGS. 5, 6, 7, 8 and 9 are aberration curves of embodiments 1, 2, 3, 4 and 5, respectively.
Figure 6:
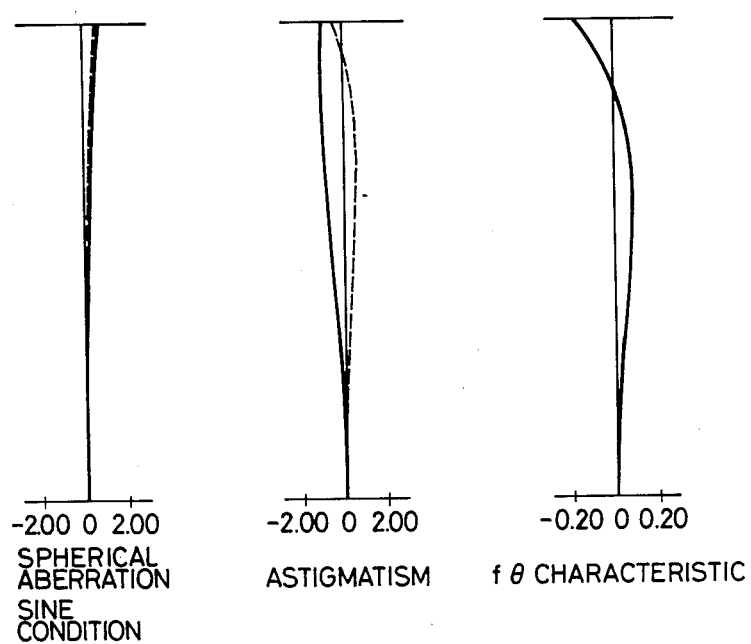
Figure 7:
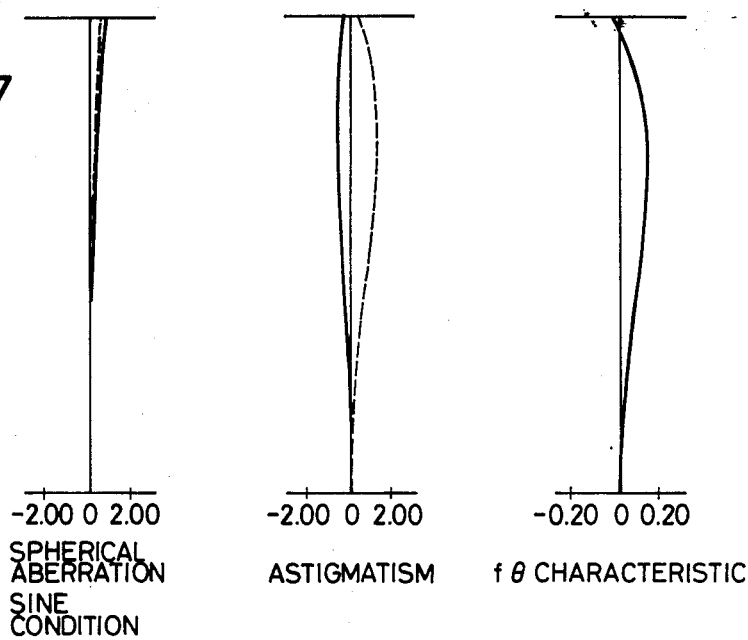
Figure 8:
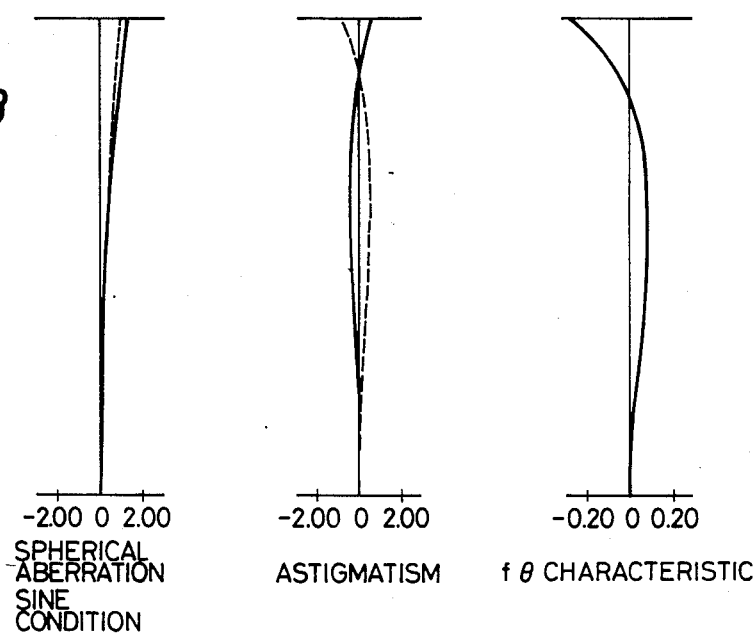
Figure 9:
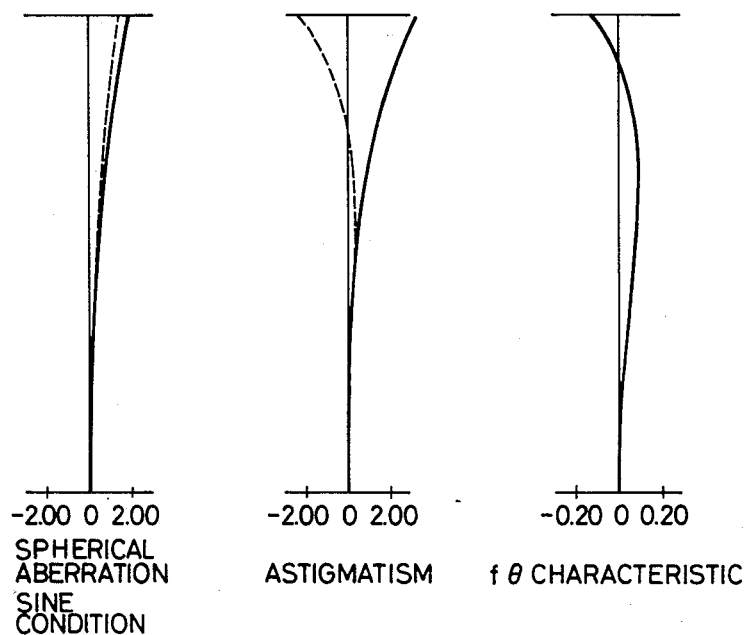

In these embodiments, a glass material for the first lens is BK7 and a material for the second lens is SF11. Symbols R, d and t in tables are indicated in FIG. 1.

In the tables, f is equal to 206.3 and a deflection angle θ is equal to ±30°.

| | Embodiment 1 | | Embodiment 2 |
|---|---|---|---|
| R1 | −24.162 | R1 | −22.953 |
| R2 | −30.2 | R2 | −28.993 |
| R3 | −604.03 | R3 | −640.28 |
| R4 | −95.337 | R4 | −93.324 |
| d1 | 6.04 | d1 | 6.04 |
| d2 | 3.02 | d2 | 2.42 |
| d3 | 7.25 | d3 | 5.56 |
| t | −39.87 | t | −38.05 |
| | Embodiment 3 | | Embodiment 4 |
| R1 | −24.162 | R1 | −19.328 |
| R2 | −31.409 | R2 | −24.162 |
| R3 | −480.223 | R3 | −906.043 |
| R4 | −88.792 | R4 | −92.449 |
| d1 | 7.25 | d1 | 4.83 |
| d2 | 1.21 | d2 | 1.21 |
| d3 | 7.25 | d3 | 6.04 |
| t | −39.26 | t | −33.04 |
| | Embodiment 5 | | |
| R1 | −18.121 | | |
| R2 | −24.162 | | |
| R3 | −422.82 | | |
| R4 | −76.966 | | |
| d1 | 6.04 | | |
| d2 | 1.21 | | |
| d3 | 7.25 | | |
| t | −29.29 | | |

Being constructed as described above, the fθ lens according to the present invention has the following effects:

(1) The first lens is formed into a concentric spherical surface to thereby reduce the Petzval's sum, and the image surface is flattened to thereby form a scanning angle into a wider angle.

(2) The power of the first lens is included in the condition (1) to thereby include the Petzval's sum and the spherical aberration and comatic aberration into the required range.

(3) The length $\overline{OC} = L$ between the optical deflection point O and the center C of the first lens is included within the range of the condition (2) to thereby maintain the fθ characteristic and astigmatism in a good condition.

What is claimed is:

1. A two-lens fθ lens comprising a first single lens in the contour of a concentric spherical surface with a concave surface oriented toward a deflection point of a laser beam, and a second single lens positioned on the light-moving side relative to said first single lens and having a positive power, said fθ lens being satisfied with the conditions below:

$$-2.5 < f_1/f < -1$$

$$0.04 < L/f < 0.08$$

where $f_1$ represents the focal length of the first single lens, f the focal length of the entire fθ lens system, and L the length $\overline{OC}$ between a common center C of both refractive surfaces of the first single lens and a deflection point O of a laser beam.

2. The $f\theta$ lens according to claim 1 wherein if R is the radius of curvature of the refractive surface, d is the spacing between the refractive surfaces, and t is the spacing between a beam deflection point and first refractive surface of the first lens, the following data is given:

| | |
|---|---|
| R1 | −24.162 |
| R2 | −30.2 |
| R3 | −604.03 |
| R4 | −95.337 |
| d1 | 6.04 |
| d2 | 3.02 |
| d3 | 7.25 |
| t | −39.87 |

3. The $f\theta$ lens according to claim 1 wherein if R is the radius of curvature of the refractive surface, d is the spacing between the refractive surfaces, and t is the spacing between a beam deflection point and the first refractive surface of the first lens, the following data is given:

| | |
|---|---|
| R1 | −22.953 |
| R2 | −28.993 |
| R3 | −640.28 |
| R4 | −93.324 |
| d1 | 6.04 |
| d2 | 2.42 |
| d3 | 5.56 |
| t | −38.05 |

4. The $f\theta$ lens according to claim 1 wherein if R is the radius of curvature of the refractive surface, d is the spacing between the refractive surfaces, and t is the spacing between a beam deflection point and the first refractive surface of the first lens, the following data is given:

| | |
|---|---|
| R1 | −24.162 |
| R2 | −31.409 |
| R3 | −480.223 |
| R4 | −88.792 |
| d1 | 7.25 |
| d2 | 1.21 |
| d3 | 7.25 |
| t | −39.26 |

5. The $f\theta$ lens according to claim 1 wherein if R is the radius of curvature of the refractive surface, d is the spacing between the refractive surfaces, and t is the spacing between a beam deflection point and the first refractive surface of the first lens, the following data is given:

| | |
|---|---|
| R1 | −19.328 |
| R2 | −24.162 |
| R3 | −906.043 |
| R4 | −92.449 |
| d1 | 4.83 |
| d2 | 1.21 |
| d3 | 6.04 |
| t | −33.04 |

6. The $f\theta$ lens according to claim 1 wherein if R is the radius of curvature of the refractive surface, d is the spacing between the refractive surfaces, and t is the spacing between a beam deflection point and teh first refractive surface of the first lens, the following data is given:

| | |
|---|---|
| R1 | −18.121 |
| R2 | −24.162 |
| R3 | −422.82 |
| R4 | −76.966 |
| d1 | 6.04 |
| d2 | 1.21 |
| d3 | 7.25 |
| t | −29.29 |

* * * * *